United States Patent
Ham

(10) Patent No.: US 7,243,933 B2
(45) Date of Patent: Jul. 17, 2007

(54) SUSPENSION SYSTEM WITH AUTOMATIC TOE CONTROL FUNCTION

(75) Inventor: Hyoung-Seung Ham, Uiwang-si (KR)

(73) Assignee: Kia Motors Corporation, Seocho-Ku, Seoul (KR)

( * ) Notice: Subject to any disclaimer, the term of this patent is extended or adjusted under 35 U.S.C. 154(b) by 200 days.

(21) Appl. No.: 11/028,288

(22) Filed: Dec. 30, 2004

(65) Prior Publication Data

US 2006/0049602 A1    Mar. 9, 2006

(30) Foreign Application Priority Data

Sep. 6, 2004  (KR) ....................... 10-2004-0070832

(51) Int. Cl.
  *B60G 7/02*  (2006.01)
(52) U.S. Cl. .................... 280/124.109; 280/124.15; 280/86.758; 280/124.35

(58) Field of Classification Search ............. 280/86.75, 280/86.758, 5.52, 5.521, 5.523, 5.524, 5.522, 280/124.143, 124.134, 124.135, 124.109, 280/124.15

See application file for complete search history.

(56) References Cited

U.S. PATENT DOCUMENTS

| | | | | |
|---|---|---|---|---|
| 2,071,577 | A * | 2/1937 | Somerville | 267/230 |
| 4,616,845 | A * | 10/1986 | Pettibone | 280/86.753 |
| 5,116,076 | A * | 5/1992 | Moll | 280/124.138 |
| 5,700,025 | A * | 12/1997 | Lee | 280/86.751 |
| 6,338,495 | B1 * | 1/2002 | Lee et al. | 280/124.143 |
| 6,406,036 | B1 * | 6/2002 | Laurent et al. | 280/5.509 |
| 6,467,783 | B1 * | 10/2002 | Blondelet et al. | 280/124.106 |
| 2003/0122336 | A1 * | 7/2003 | Zadok | 280/124.106 |

* cited by examiner

*Primary Examiner*—Paul N. Dickson
*Assistant Examiner*—Tiffany L. Webb
(74) *Attorney, Agent, or Firm*—Morgan Lewis & Bockius LLP

(57) ABSTRACT

A suspension system including two lateral arms whose lower arms are disposed at the front and rear of the center of wheels is provided. One end of the two lateral arms is mounted to a cross member while the other end is connected to a carrier assembly. The outer wheels of a turning vehicle automatically form a toe-in according to the movement of a turning vehicle, thus inducing an understeer and improving driving stability of the vehicle.

4 Claims, 4 Drawing Sheets

SUSPENSION SYSTEM WITH AUTOMATIC TOE CONTROL FUNCTION

CROSS-REFERENCE TO RELATED APPLICATIONS

The present application is based on, and claims priority from, Korean Application Serial Number 10-2004-0070832, filed on Sep. 6, 2004, the disclosure of which is hereby incorporated by reference herein in its entirety.

FIELD OF THE INVENTION

The present invention relates to a suspension system of a vehicle. More particularly, the present invention relates to a rear suspension system adapted to automatically change the toe of wheels according to the vehicle movement.

BACKGROUND OF THE INVENTION

One type of suspension system has two lateral arms in which lower arms are disposed at the front and rear of the center of wheels. The two lateral arms are mounted at one end thereof to a cross member while the other end is connected to a carrier assembly.

Generally, the two lateral arms are a front arm and rear arm, which are disposed toward the front and rear of the vehicle. The front arm and rear arm are typically fixed via hinge pins to the cross member to thereby vertically pivot in relation to the cross member according to the vertical movement of vehicle wheels in relation to the vehicle body.

SUMMARY OF THE INVENTION

Embodiments of the present invention are provided to automatically align rear wheels in a toe-in according to the movement of a turning vehicle, thereby inducing an understeer and improving the driving stability of the vehicle.

A suspension system having an automatic toe control function includes a cross member, and a front arm pivotably connected to the cross member. A rear arm is pivotably connected to the cross member. A rear link arm is equipped with a member rotational shaft and an arm rotational shaft. The member rotational shaft is pivotably connected to the cross member, and the arm rotational shaft is pivotably connected to the rear arm and is parallel to the member rotational shaft.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
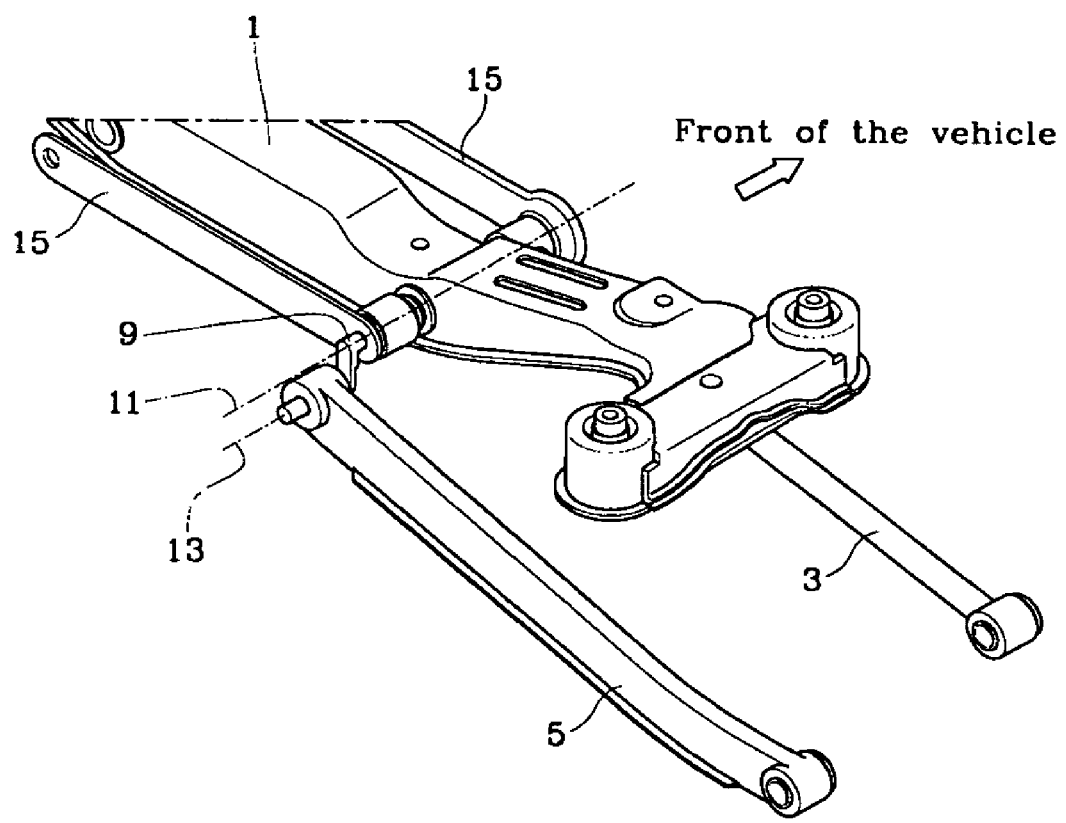
FIG. 1 is a perspective view illustrating a suspension system according to an embodiment of the present invention.

Referring to FIG. 1, a front arm 3 and a rear arm 5 are pivotably connected to a cross member 1. Cross member 1 is coupled to the vehicle body, and front arm 3 is pivotably connected to cross member 1 via a hinge pin 7 (see FIG. 3).

Rear arm 5 is pivotably connected to cross member 1 via a rear link arm 9. Rear link arm 9 is integrally mounted with a member rotational shaft 11 and arm rotational shaft 13. Member rotational shaft 11 is pivotably connected to cross member 1, and arm rotational shaft 13 is pivotably connected to rear arm 5. Arm rotational shaft 13 is parallel to member rotational shaft 11. Arm rotational shaft 13 of rear link arm 9 is disposed lower than member rotational shaft 11.

Rear arm 5 and front arm 3 are coupled with a carrier assembly (not shown), which is coupled to wheels. Hinge pin 7 and rear link arm 9 are coupled to reinforcements 15, respectively, to stably be supported by reinforcements 15.

The operation of the embodiment of the present invention will now be described in detail with reference to FIGS. 2 and 3.

When a vehicle makes a turn, angular acceleration results in a force that is centered at the vehicle center of gravity and the vehicle tilts in a direction away from the turn center. The outer suspension state of a turning vehicle is expressed in dotted lines in FIG. 2 while the outer suspension state for a forward driving is expressed in solid lines.

Figure 2:
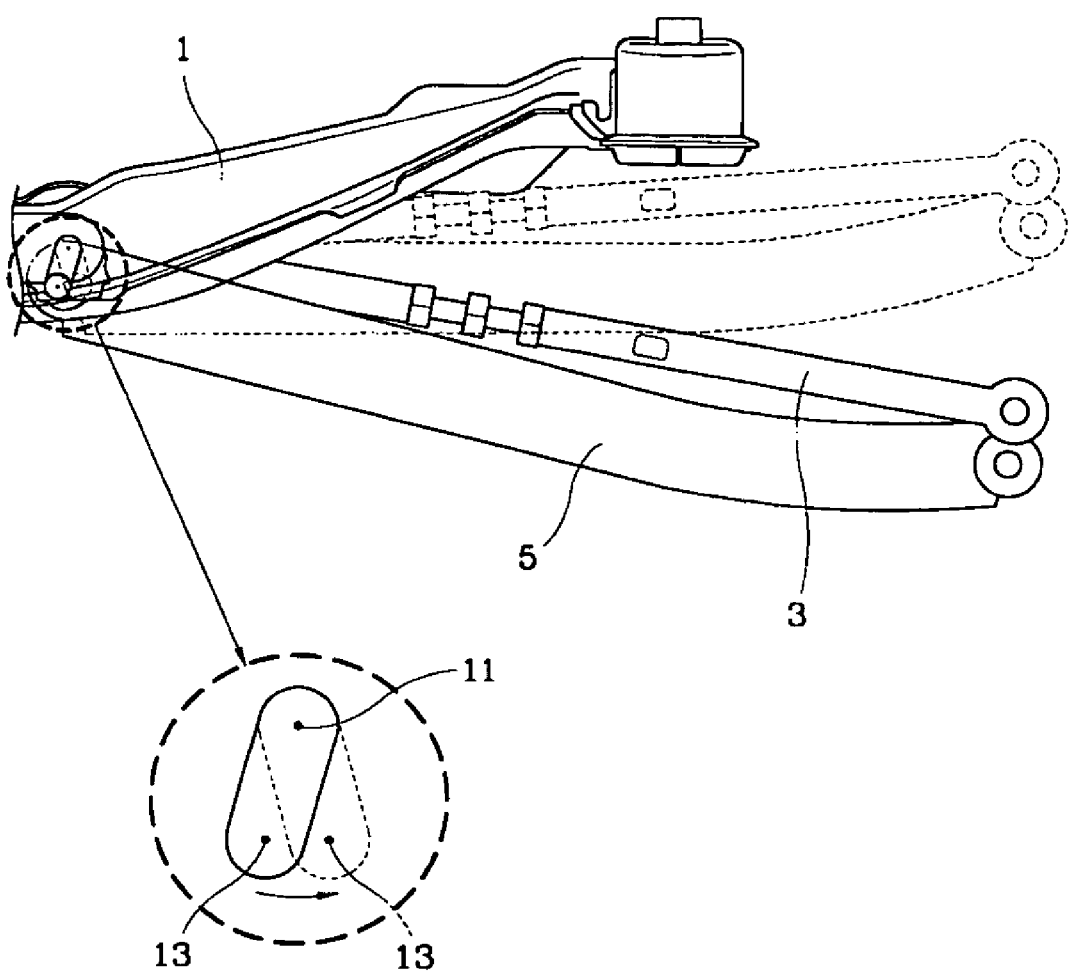
FIG. 2 illustrates an operation state of the present invention when observed from the rear of the vehicle.

The outer wheels of a turning vehicle are upwardly shifted toward the vehicle body, thus front arm 3 and rear arm 5 pivot in the counterclockwise direction as illustrated in FIG. 2 and support the wheel in relation to the vehicle body. When rear arm 5 supports the wheel by being pivoted in the counterclockwise direction, member rotational shaft 11 and arm rotational shaft 13 deviate from an identical axis. As illustrated in FIG. 2, arm rotational shaft 13 slightly pivots in the counterclockwise direction in relation to the member rotational shaft 11, and rear arm 5 moves away from the turn center of the turning vehicle.

Figure 3:
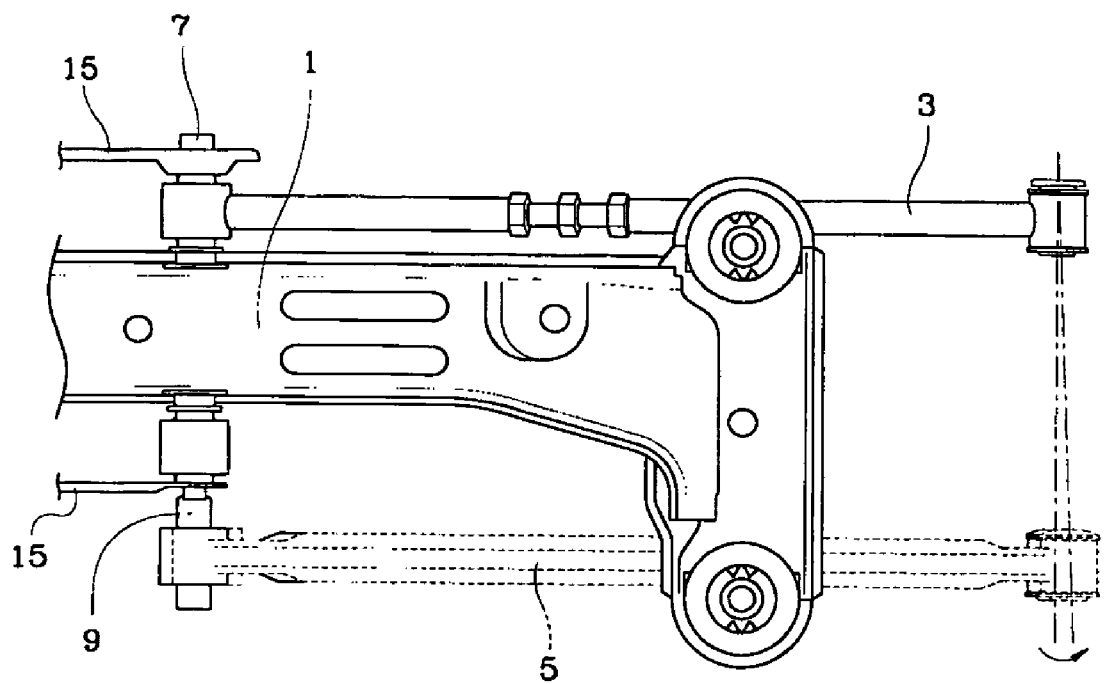
FIG. 3 illustrates an operation state of the present invention when observed from the top of the vehicle.

Though front arm 3 does not move away from the turn center of the turning vehicle, rear arm 5 slightly moves away from the turn center of the turning vehicle (see FIG. 3). Therefore, carrier assembly connected to front arm 3 and rear arm 5 pivot and cause a toe-in of the wheel.

The shifting degree of rear arm 5 away from the turn center of the turning vehicle varies according to the size of the turning angle, causing an automatic toe-in of the wheel in response to the turning degree of the vehicle. If the outer wheels of the turning vehicle bump (moving toward an upper side of the vehicle body), the arm rotational shaft connected to the relevant rear arm moves and then the rear arm shifts toward the exterior of the vehicle body. This adjusts the wheels to be in the toe-in when observing from the top of the vehicle, and the understeer function is increased in the vehicle.

Figure 4:
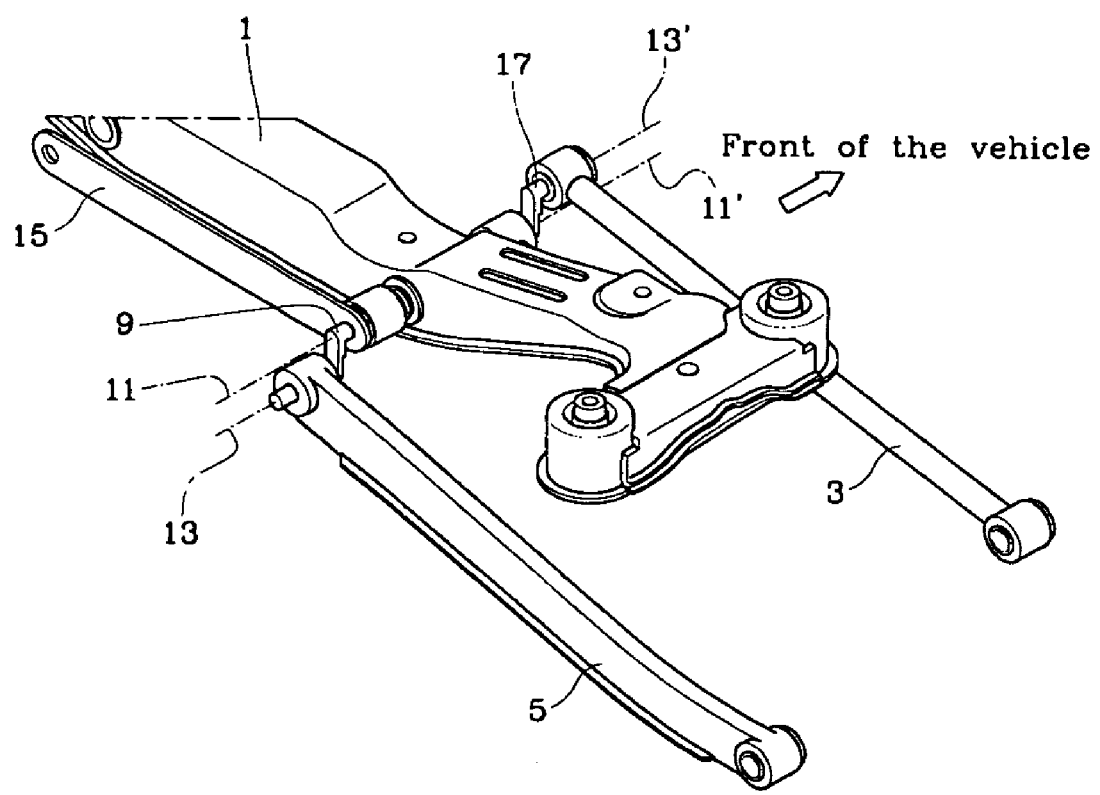
FIG. 4 illustrates another embodiment of the present invention.

According to another embodiment of the present invention, rear arm 5 and cross member 1 are connected via rear link arm 9 and, simultaneously, front arm 3 is connected to cross member 1 via a front link arm 17 in FIG. 4.

Front link arm 17 is mounted with a member rotational shaft 11' pivotably connected to cross member 1, and an arm rotational shaft 13' pivotably connected to front arm 3. Arm rotational shaft 13' is parallel to member rotational shaft 11'. Arm rotational shaft 13' of front link arm 17 is located higher than member rotational shaft 11'.

Rear arm 5 of FIG. 4 moves similar to the embodiment of FIG. 1. If the outer wheels of a turning vehicle bump, arm rotational shaft 13 connected to rear arm 5 moves toward the exterior of the vehicle to induce a toe-in. Front arm 3 also induces a toe-in of the wheel with arm rotational shaft 13' of front link arm 17 being shifted inwardly to the vehicle. The configuration of FIG. 4 forms a larger toe-in than that of FIG. 1 by a movement of front arm 3 and front link arm 17, together with, a movement of rear link arm 9 of rear arm 5.

In a third embodiment of the present invention, front arm 3 and front link arm 17 are connected as illustrated in FIG. 4 and rear arm 5 is connected to crossmember 1 in the conventional manner, thus front arm 3 inwardly moves to the vehicle by the operation of front arm 3 and front link arm 17 and a toe-in is formed during a vehicle turn.

The toe-in effect automatically generated during a vehicle turn induces an understeer and increases driving stability of the vehicle.

As apparent from the foregoing, there is an advantage in that the outer wheels of a turning vehicle automatically form a toe-in according to the movement of the turning vehicle in a suspension system, thereby inducing an understeer and improving driving stability of the vehicle.

What is claimed is:

1. A suspension system having an automatic toe control function, comprising:
    a cross member;
    a front arm pivotably connected to said cross member;
    a rear arm pivotably connected to said cross member; and
    a rear link arm installed with a member rotational shaft and an arm rotational shaft, said member rotational shaft being directly pivoted to said cross member, and said arm rotational shaft being directly pivoted to said rear arm and being parallel to said member rotational shaft.

2. The system as defined in claim 1, wherein said arm rotational shaft of said rear link arm is disposed lower than said member rotational shaft.

3. A suspension system having an automatic toe control function, the system comprising:
    a cross member;
    a front arm pivotably connected to said cross member;
    a rear arm pivotably connected to said cross member; and
    a front link arm installed with a member rotational shaft and an arm rotational shaft, said member rotational shaft being directly pivoted to said cross member, and said arm rotational shaft being directly pivoted to said front arm and being parallel to said member rotational shaft, wherein said arm rotational shaft of said front link arm is disposed higher than said member rotational shaft.

4. A suspension system having an automatic toe control function, the system comprising:
    a cross member;
    a front arm pivotably connected to said cross member;
    a rear arm pivotably connected to said cross member;
    a rear link arm installed with a member rotational shaft and an arm rotational shaft, said member rotational shaft being directly pivoted to said cross member, and said arm rotational shaft being directly pivoted to said rear arm and being parallel to said member rotational shaft; and
    a front link arm installed with a member rotational shaft and an arm rotational shaft, said member rotational shaft being directly pivoted to said cross member, and said arm rotational shaft being directly pivoted to said front arm and being parallel to said member rotational shaft, wherein said arm rotational shaft of said rear link arm is disposed lower than said member rotational shaft, and said arm rotational shaft of said front link arm is disposed higher than said member rotational shaft.

* * * * *